US011254884B2

(12) United States Patent
Kiiski et al.

(10) Patent No.: US 11,254,884 B2
(45) Date of Patent: Feb. 22, 2022

(54) FUEL COMPRISING KETONE(S)

(71) Applicant: Neste Oyj, Espoo (FI)

(72) Inventors: Ulla Kiiski, Hamari (FI); Maija Rouhiainen, Oulu (FI); Jukka Myllyoja, Vantaa (FI); Esko Karvinen, Helsinki (FI); Pia Bergström, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 16/337,853

(22) PCT Filed: Sep. 27, 2017

(86) PCT No.: PCT/EP2017/074504
§ 371 (c)(1),
(2) Date: Mar. 28, 2019

(87) PCT Pub. No.: WO2018/060248
PCT Pub. Date: Apr. 5, 2018

(65) Prior Publication Data
US 2020/0040269 A1    Feb. 6, 2020

(30) Foreign Application Priority Data

Sep. 29, 2016 (FI) .................................. 16191278.7

(51) Int. Cl.
| | | |
|---|---|---|
| *C10L 1/185* | (2006.01) | |
| *C10L 1/02* | (2006.01) | |
| *C10L 10/10* | (2006.01) | |
| *C10L 10/12* | (2006.01) | |

(52) U.S. Cl.
CPC ............. *C10L 1/1857* (2013.01); *C10L 1/023* (2013.01); *C10L 1/026* (2013.01); *C10L 10/10* (2013.01); *C10L 10/12* (2013.01); *C10L 2200/0469* (2013.01); *C10L 2270/023* (2013.01); *C10L 2270/026* (2013.01); *C10L 2270/04* (2013.01)

(58) Field of Classification Search
CPC .. C10L 10/10; C10L 10/12; C10L 1/02; C10L 1/023; C10L 1/026; C10L 1/1857; C10L 2200/0469; C10L 2270/023; C10L 2270/026; C10L 2270/04
See application file for complete search history.

(56) References Cited

U.S. PATENT DOCUMENTS

| | | | |
|---|---|---|---|
| 2,176,747 A * | 10/1939 | Schneider | ............... C10L 1/023 44/439 |
| 4,131,434 A | 12/1978 | Gonzalez | |
| 4,378,973 A | 4/1983 | Sweeney | |
| 4,950,763 A | 8/1990 | Schommer et al. | |
| 5,931,977 A | 8/1999 | Yang | |
| 9,790,444 B2 | 10/2017 | Baer et al. | |
| 2002/0026744 A1* | 3/2002 | Golubkov | ............... C10L 1/026 44/436 |
| 2008/0244963 A1 | 10/2008 | Demoment et al. | |
| 2015/0018581 A1 | 1/2015 | Kettunen et al. | |
| 2015/0018588 A1 | 1/2015 | Myllyoja et al. | |
| 2015/0251168 A1 | 9/2015 | Kettunen et al. | |
| 2016/0152907 A1 | 6/2016 | Baer et al. | |

FOREIGN PATENT DOCUMENTS

| | | |
|---|---|---|
| CN | 105308015 A | 2/2016 |
| DE | 2300841 A1 | 7/1974 |
| DE | 3825873 A1 | 2/1990 |
| DE | 3920280 A1 | 1/1991 |
| EP | 1589091 A1 | 10/2005 |
| FR | 2367110 A1 | 5/1978 |
| WO | 2010151343 A1 | 12/2010 |
| WO | 2013113976 A1 | 8/2013 |
| WO | 2016062868 A1 | 4/2016 |

OTHER PUBLICATIONS

Extended European Search Report issued in corresponding European Patent Application No. 16191278.7, 14 pages (dated Jun. 28, 2017).
International Search Report and Written Opinion issued in corresponding International Patent Application No. PCT/ PCT/EP2017/074504, 17 pages (dated Jan. 29, 2018).
Deng, L., et al., "Upgraded Acidic Components of Bio-oil through Catalytic Ketonic Condensation," American Chemical Society, Energy & Fuels, vol. 23, No. 1, Jan. 22, 2009, pp. 564-568.
Hellier, P., et al., "Influence of Carbonate Ester Molecular Structure on Compression Ignition Combustion and Emissions," American Chemical Society, Energy & Fuels, Jul. 25, 2013, 27, 5222-5245.
Renz, M., "Ketonization of Carboxylic Acids by Decarboxylation: Mechanisn1 and Scope," Wiley-VCH Verlag GmbH & Co, K.GaA, Weinheim, MICROREVIEW, Eur. J Org. Chem, www.eurjoc.org, vol. 2005, No. 6, Mar. 1, 2005, pp. 979-988.
Office Action (Communication) dated Dec. 11, 2019, by the European Patent Office in corresponding European Patent Application No. 16191278.7. (5 pages).
Second Office Action dated Mar. 18, 2021, by the Chinese Patent Office in corresponding Chinese Patent Application No. 201780060594. 7, and an English Translation of the Office Action. (16 pages).
First Office Action dated Sep. 22, 2020, by the Chinese Patent Office in corresponding Chinese Patent Application No. 201780060594.7, and an English Translation of the Office Action. (15 pages).

* cited by examiner

*Primary Examiner* — Latosha Hines
(74) *Attorney, Agent, or Firm* — Buchanan Ingersoll & Rooney PC

(57) ABSTRACT

Provided are fuel components, a method for producing fuel components, use of the fuel components and fuel containing the fuel components based on ketone(s).

7 Claims, No Drawings

FUEL COMPRISING KETONE(S)

TECHNICAL FIELD

The present invention relates to the use of ketone(s) as a fuel component, a method for producing ketone(s), and a fuel containing ketone(s). In particular, the present invention relates to fossil and/or renewable fuel components based on ketone(s).

TECHNICAL BACKGROUND

The production of fuel components from renewable sources is of increasing interest in view of greenhouse gas production when using fossil fuel. Therefore, there is an increasing interest to find suitable alternative compounds which can be used as a fuel and to find methods for upgrading renewable material so as to be suitable for use in fuel. Many known methods for upgrading renewable material employ large amounts of hydrogen gas in order to convert the oxygen-containing renewable material into hydrocarbon compositions suitable for fuel applications. However, since hydrogen gas is mainly produced from fossil sources, there still is room for improvement regarding methods employing less hydrogen gas while yet providing high quality fuel components.

Ketones can be produced from various renewable sources. For example, the most common way of producing 5-nonanone from levulinic acid (LA) is the conversion of LA to γ-valerolactone (GVL), subsequent conversion of GVL to pentanoic acid (PA), which is then converted to 5-nonanone.

Ketones can be produced from carboxylic acids via ketonisation, which method does not require the addition of hydrogen but nevertheless significantly reduces the oxygen content of the bio-derived material. In the ketonisation reaction, the oxygen is removed in the form of carbon dioxide and water. However, the prior art still faces problems regarding selectivity and conversion efficiency in the production of ketones, in particular in the production of 5-nonanone. Accordingly, processes for producing ketones from renewable sources in industrial scale and with high selectivity and conversion rate are highly desired.

Methods relating to the production of ketones and the production of fuel components and other chemicals via ketones are known in the art. Specifically, the prior art discloses several methods employing 5-nonanone as an intermediate in the production of fuel components. These methods generally employ hydrogenation of 5-nonanone or a reaction product derived from 5-nonanone for providing a hydrocarbon fuel.

It is known that 5-nonanone can be produced from LA via GVL and pentanoic acid. The pentanoic acid is then converted to 5-nonanone over $Pd/Nb_2O_5$. Unreacted pentanoic acid is the major impurity in the 5-nonanone i.e. dibutylketone (DBK). The boiling points of 5-nonanone and pentanoic acid are very similar, so that separation of these two compounds using simple distillation methods is difficult. A series of flash separation and distillation as well as optional extraction using methanol may be used to obtain a purity of 90% or more. However, this technique requires large scale distillation and consumes much energy.

Accordingly, there is still need for methods to produce ketones, such as 5-nonanone, using a simplified and less energy consuming method.

Ketonisation of pentanoic acid to 5-nonanone, followed by hydrogenation to provide nonanol and optional oligomerization of an alkene such as non-4-ene derived from nonanol to produce hydrocarbon compositions is also known.

WO 2010/151343 A1 discloses ketonisation of pentanoic acid to 5-nonanone and use of 5-nonanone as a precursor for fuel applications.

SUMMARY OF THE INVENTION

The present invention is defined in the independent claims. Further beneficial embodiments are set forth in the dependent claims. Specifically, the present invention relates to one or more of the following item's:

1. A fuel comprising ketone(s) represented by the following formula (1):

wherein $R_1$ and $R_2$ are the same or different and are independently selected from alkyl groups having 1 to 5 carbon atoms. In other words, the fuel of the present invention contains one or more ketones represented by formula (1).

The alkyl groups may be branched or linear alkyl groups. Linear alkyl groups are preferred. The alkyl groups are preferably selected from the list consisting of methyl group, ethyl group, propyl group (n-propyl), butyl group (n-butyl), pentyl group (n-pentyl), isobutyl group, and t-butyl group. In the ketone of the invention, it is preferable that at least one of $R_1$ and $R_2$ is an alkyl group having 2 or more carbon atoms.

Further, the present invention relates to a fuel comprising ketone, which is preferably 5-nonanone (may be referred to as "ketone" in the following).

The fuel of the present invention is a blend comprising the ketone and a further fuel component. Specifically, the fuel of the present invention is a combustion engine fuel, such as a diesel fuel, a gasoline fuel or a jet fuel.

More specifically, the fuel of present invention may be a mixture of compounds, in which the main components, preferably 50 vol-% or more, are hydrocarbons containing 4 to 25 carbon atoms. Jet fuel may be a mixture of compounds, in which the main components, preferably 50 vol-% or more, are hydrocarbons containing 9 to 16 carbon atoms. Gasoline fuel may be a mixture of compounds, in which the main components, preferably 50 vol-% or more, are hydrocarbons containing 4 to 9 carbon atoms.

2. The fuel according to item 1, wherein the fuel is a diesel fuel.

Diesel fuel may be a mixture of compounds, in which the main components, preferably 50 vol-% or more, are hydrocarbons containing 11 to 25 carbon atoms. Preferably, diesel fuel within the meaning of the present invention is a fuel having a distillation range from 160° C. to 370° C., more preferably from 180° C. to 360° C. Preferably, the diesel fuel has a density (15° C., according to EN ISO 12185) of 860 kg/m³ or less, more preferably 840 kg/m³ or less and preferably 800 kg/m³ or more, more preferably 820 kg/m³ or more. The diesel fuel further preferably has a viscosity at 40° C. (according to EN ISO 3104) of 1.20 mm²/s or more, preferably 2.00 mm²/s, and preferably 4.50 mm²/s or less, more preferably 4.00 mm²/s or less. The sulfur content of the diesel fuel, as measured according to EN ISO 20846, is preferably 10.0 mg/kg or less. Most preferably, a diesel fuel of the present invention is a diesel fuel fulfilling the requirements of the EN 590:2013 standard.

3. The fuel according to items 1 or 2, wherein the fuel is a diesel fuel and the content of the ketone(s) is 2.0 to 45.0 vol-%, more preferably 2.0-20.0 vol-%, most preferably 2.0-15.0 vol-%.

4. The fuel according to any one of items 1 to 3, wherein the ketone(s) is/are one of the following (a), (b) or (c):
(a) a compound in which $R_1$ and $R_2$ are the same;
(b) a compound in which $R_1$ and $R_2$ are different;
(c) a mixture of compounds each represented formula (1), wherein the compounds are independently represented by one of the following formulas (2) to (4), and wherein $R_1$ and $R_2$ are different:

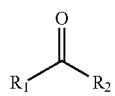

(2)

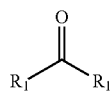

(3)

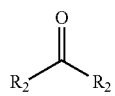

(4)

5. The fuel according to any one of items 1 to 4, comprising 5-nonanone.

The ketone(s) of the fuel product of the present invention preferably contain(s) at least 2 vol-%, at least 5 vol-%, at least 10 vol-%, at least 20 vol-%, at least 30 vol-%, at least 40 vol-%, at least 50 vol-%, at least 60 vol-%, at least 80 vol-%, at least 90 vol %, at least 95 vol-%, at least 97 vol-%, at least 98 vol-%, at least 99 vol-%, or 100 vol % 5-nonanone relative to all ketones of formula (1), because 5-nonanone has shown to provide exceptionally good properties.

6. The fuel according to any one of items 1 to 5, wherein the content of the ketone(s) in the fuel is 2.0 to 50.0 vol-%, more preferably 2.0 to 20.0 vol-%, most preferably 2.0 to 15.0 vol-%.

7. The fuel according to any one of items 1 to 6, wherein the sum of carbon atoms of the groups $R_1$ and $R_2$ is 3 to 10, preferably 4 to 10, more preferably 6 to 10.

8. The fuel according to any one of items 1 to 7, wherein $R_1$ is selected from the group consisting of methyl, ethyl, propyl (n-propyl or isopropyl), butyl (n-butyl, iso-butyl or tert-butyl) and pentyl (linear or branched), preferably propyl (n-propyl or isopropyl), butyl (n-butyl, iso-butyl or tert-butyl) and pentyl (linear or branched), more preferably butyl (n-butyl, iso-butyl or tert-butyl, preferably n-butyl).

9. The fuel according to any one of items 1 to 8, wherein $R_2$ is selected from the group consisting of methyl, ethyl, propyl (n-propyl or isopropyl), butyl (n-butyl, iso-butyl or tert-butyl) and pentyl (linear or branched), preferably propyl (n-propyl or isopropyl), butyl (n-butyl, iso-butyl or tert-butyl) and pentyl (linear or branched), more preferably butyl (n-butyl, iso-butyl or tert-butyl, preferably n-butyl).

10. A method of producing ketone(s) represented by the following formula (1):

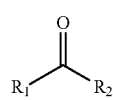

(1)

wherein $R_1$ and $R_2$ are the same or different and are independently selected from alkyl groups having 1 to 5 carbon atoms, the method comprising:
providing a ketonisation feedstock comprising carboxylic acid(s) having from 2 to 6 carbon atoms, and
performing a ketonisation reaction by converting the carboxylic acid(s) to the ketone(s) in the presence of an oxide catalyst,
wherein the oxide catalyst comprises an alkali metal oxide and at least one further metal oxide.

11. The method according to item 10, wherein the ketone(s) is/are one of the following (a), (b) or (c):
(a) a compound in which $R_1$ and $R_2$ are the same;
(b) a compound in which $R_1$ and $R_2$ are different;
(c) a mixture, of compounds each represented formula (1), wherein the compounds are independently represented by one of the following formulas (2) to (4), and wherein $R_1$ and $R_2$ are different:

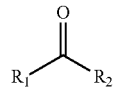

(2)

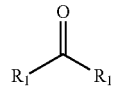

(3)

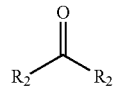

(4)

The type of carboxylic acids which is contained in the feedstock determines the composition of the ketone of the present invention i.e. the kind of ketone compound or the composition of a mixture of ketones.

That is, in case only one type of carboxylic acid is present, the ketonisation reaction will result in a symmetric ketone compound which means that $R_1$ and $R_2$ are the same. If two different carboxylic acids are present, the ketonisation reaction will result in a mixture of two symmetric ketones in which one is with $R_1$ only and one with $R_2$ only and one asymmetric ketone. If three or more different carboxylic acids are present, a mixture of even more different ketones will be obtained.

12. The method according to item 10 or 11, wherein the ketone(s) is/are 5-nonanone.

13. The method according to any one of items 10 to 12, wherein the ketone(s) contain(s) at least 2 vol-%, at least 5 vol-%, at least 10 vol-%, at least 20 vol-%, at least 30 vol-%, at least 40 vol-%, at least 50 vol-%, at least 60 vol-%, at least 80 vol-%, at least 90 vol %, at least 95 vol-%, at least 97 vol-%, at least 98 vol-%, at least 99 vol-%, or 100 vol % 5-nonanone relative to all ketones of formula (1).

14. The method according to any one of items 10 to 13, wherein the alkali metal comprises potassium.

15. The method according to any one of items 10 to 13, wherein the at least one further metal oxide is selected from the group consisting of titania, silica, ceria, zirconia and γ-alumina, or mixtures, mixed oxides or solid solutions of these, preferably the at least one further metal oxide is selected from the group consisting of ceria-zirconia mixed oxide, titania, and a mixture of γ-alumina and titania.

16. The method according to any one of items 10 to 15, wherein the sum of carbon atoms of the groups $R_1$ and $R_2$ is 3 to 12, preferably 4 to 10, more preferably 6 to 10.

17. The method according to any one of items 10 to 16, wherein $R_1$ is selected from the group consisting of methyl, ethyl, propyl (n-propyl or isopropyl), butyl (n-butyl, iso-butyl or tert-butyl) and pentyl (linear or branched), preferably propyl (n-propyl or isopropyl), butyl (n-butyl, iso-butyl or tert-butyl) and pentyl (linear or branched), more preferably butyl (n-butyl, iso-butyl or tert-butyl, preferably n-butyl).

18. The method according to any one of items 10 to 17, wherein $R_2$ is selected from the group consisting of methyl, ethyl, propyl (n-propyl or isopropyl), butyl (n-butyl, iso-butyl or tert-butyl) and pentyl (linear or branched), preferably propyl (n-propyl or isopropyl), butyl (n-butyl, iso-butyl or tert-butyl) and pentyl (linear or branched), more preferably butyl (n-butyl, iso-butyl or tert-butyl, preferably n-butyl).

19. A method of using ketone(s) represented by the following formula (1) for preparing a fuel according to any one of claims 1 to 9:

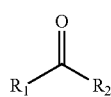

(1)

wherein $R_1$ and $R_2$ are the same or different and are independently selected from alkyl groups having 1 to 5 carbon atoms.

20. The method according to item 19, wherein the ketone(s) is/are one of the following (a), (b) or (c):
(a) a compound in which $R_1$ and $R_2$ are the same;
(b) a compound in which $R_1$ and $R_2$ are different;
(c) a mixture of compounds each represented formula (1), wherein the compounds are independently represented by one of the following formulas (2) to (4), and wherein $R_1$ and $R_2$ are different:

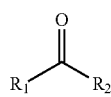

(2)

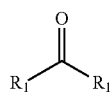

(3)

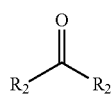

(4)

21. The method according to item 19 or 20, wherein the ketone(s) is/are 5-nonanone.

22. The method according to any one of items 19 to 21, wherein the ketone(s) contain(s) at least 2 vol-%, at least 5 vol-%, at least 10 vol-%, at least 20 vol-%, at least 30 vol-%, at least 40 vol-%, at least 50 vol-%, at least 60 vol-%, at least 80 vol-%, at least 90 vol %, at least 95 vol-%, at least 97 vol-%, at least 98 vol-%, at least 99 vol-%, or 100 vol % 5-nonanone relative to all ketones of formula (1).

23. The method according to any one of items 19 to 22, wherein the sum of carbon atoms of the groups $R_1$ and $R_2$ is 3 to 12, preferably 4 to 10, more preferably 6 to 10.

24. The method according to any one of items 19 to 23, wherein $R_1$ is selected from the group consisting of methyl, ethyl, propyl (n-propyl or isopropyl), butyl (n-butyl, iso-butyl or tert-butyl) and pentyl (linear or branched), preferably propyl (n-propyl or isopropyl), butyl (n-butyl, iso-butyl or tert-butyl) and pentyl (linear or branched), more preferably butyl (n-butyl, iso-butyl or tert-butyl, preferably n-butyl).

25. The method according to any one of items 19 to 24, wherein $R_2$ is selected from the group consisting of methyl, ethyl, propyl (n-propyl or isopropyl), butyl (n-butyl, iso-butyl or tert-butyl) and pentyl (linear or branched), preferably propyl (n-propyl or isopropyl), butyl (n-butyl, iso-butyl or tert-butyl) and pentyl (linear or branched), more preferably butyl (n-butyl, iso-butyl or tert-butyl, preferably n-butyl).

DETAILED DESCRIPTION OF THE INVENTION

Generally, the present invention relates to a method for the production of ketone, specifically production of ketone from a renewable source, to the use of ketone as a fuel component as such and/or as a feed component for fuel production processes.

In the following, a detailed description of the invention will be provided step-by-step.

Method for Production of Ketone

One aspect of the present invention relates to a method for the production of ketone(s), specifically to the production of a ketone compound or a mixture of ketones, and in particular the production of a ketone compound or a mixture of ketones from a renewable source, with high conversion (preferably more than 95 vol-%) and with high selectivity (preferably more than 95 vol-%).

In a preferred aspect, the present invention relates to the method for the production of 5-nonanone, preferably from a renewable source. Levulinic acid (LA) is a suitable raw material which can be derived from renewable sources in large quantities in industrial scale.

A schematic reaction route of producing 5-nonanone from LA, which may be employed in the method of the present invention, is as follows:

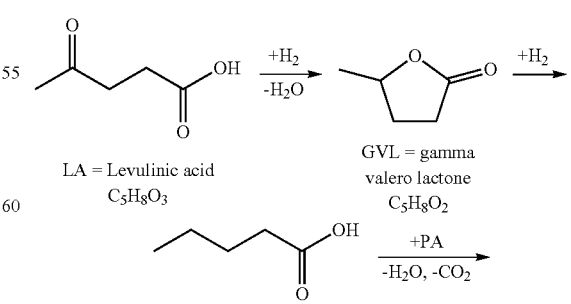

LA = Levulinic acid
$C_5H_8O_3$

GVL = gamma valero lactone
$C_5H_8O_2$

PA = Pentanoic acid
$C_5H_{10}O_2$

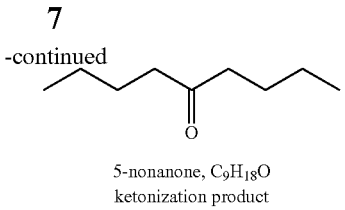

5-nonanone, $C_9H_{18}O$
ketonization product

Other ketones may be derived from LA or other sources as well, e.g. via carboxylic acid intermediates having 2 to 6 carbon atoms.

Methods for producing pentanoic acid (PA) and other carboxylic acids from LA or other sources with reasonable conversion are known in the art and any known method for producing the carboxylic acids may be employed in the present invention. In one embodiment, LA derived from a renewable source is subjected to hydrogenation to produce GVL. The GVL is subsequently or simultaneously converted to pentanoic acid by hydrogenation. Catalyst for use in the hydrogenation reaction is preferably a bi-functional catalyst, which contains acid-functionality (having for example zeolites, SAPO or IER as a catalyst component) and metal-functionality (having for example Pt or Pd as a catalyst component) so that ring-opening of GVL to pentenoic acid and hydrogenation of pentenoic acid to PA can proceed simultaneously.

Any other reaction scheme may be employed to produce the carboxylic acid, such as pentanoic acid, preferably from a renewable source, for example hydroformylation of (bio) butene or oxidation of n-paraffin. Further, the reaction scheme is not limited to routes employing LA as a raw material, although this route is preferred in view of the availability of LA in large quantities.

The prior art discloses several methods for producing ketones, e.g. methods for producing 5-nonanone from pentanoic acid. However, none of the prior art techniques achieves both high selectivity and high conversion. Specifically, the known methods for producing 5-nonanone achieve a selectivity of at most 90%, wherein the main residue is pentanoic acid (PA). This causes problems in the further procedure. Either, the PA must be separated using complicated methods or the PA leads to side reactions in the subsequent processing. Similar problems arise when converting other carboxylic acids or mixtures of carboxylic acids to ketones.

The ketone production method of the present invention, however, employs a specific oxide catalyst comprising an alkali metal oxide and at least one further metal oxide which is different from the alkali metal oxide and achieves almost full conversion, such as more than 95 vol-% relative to all liquid reaction products, of the carboxylic acid to the ketone. Accordingly, there is no need for complicated separation techniques which improves the overall energy efficiency of the process.

The oxide catalyst may be a mixed oxide, a solid solution oxide or a catalyst in which one metal oxide is supported on another metal oxide. The alkali metal oxide can be supported on at least one further metal oxide. The oxide catalyst may further be supported on a support other than a metal oxide.

The alkali metal oxide may be $K_2O$, which has shown to provide excellent conversion efficiency.

The at least one further metal oxide may be selected from the group consisting of titania, silica, ceria, zirconia and γ-alumina, or mixtures, mixed oxides or solid solutions of these. The metal oxide may be ceria-zirconia mixed oxide, titania, or a mixture of alumina and titania. The at least one further metal oxide may comprise at least titania. It is particularly preferred that the oxide catalyst is $K_2O/TiO_2$ with which catalyst a good conversion has been achieved.

The reaction may be carried out in a batch type reactor or in a continuous flow type reactor. The reaction temperature may be in the range 300° C. to 450° C., preferably in the range 360° C. to 390° C.

The weight hourly space velocity WHSV may be in the range of $0.2\ h^{-1}$ to $5.0\ h^{-1}$ depending on the dimensioning of the process parameters. The pressure (absolute) may be in the range of 1.0 bar to 25.0 bar, for example 10 bar±2 bar or 20 bar±2 bar.

The reaction may be carried out in the presence of a carrier gas such as nitrogen, hydrogen, carbon dioxide, water vapor ($H_2O$) or methane, preferably $H_2$, $CO_2$ or $H_2O$. These gases may be admixed into the reaction mixture and/or may be formed in the course of the reaction. The carrier gas may be used to expel gaseous or volatile reaction products from the product mixture such as $H_2O$ or $CO_2$.

Further, a solvent may be used in the reaction. The reaction does not require the presence of a solvent. If the reaction is carried out in the presence of a solvent, the content thereof is 50 vol-% or less. Further, it is preferable that no solvent is used.

Although it is not desired to be bound to theory, the method of the present invention is generally referred to as a ketonisation reaction. The method of the present invention provides the benefit that a highly oxygen-deficient product, having an oxygen content of about 11% by weight in the case of 5-nonanone, can be produced from carboxylic acid, having an oxygen content of about 31% by weight in the case of PA, without the need of adding hydrogen gas. Accordingly, it is preferred that no hydrogen gas is added in the ketonisation reaction while forming ketone from carboxylic acid.

The ketone(s) (ketone compound or mixture of ketones) can be processed further for example by hydrogenation or hydrodeoxygenation (HDO). The ketone(s) can also be used as a feed to a HDO and/or isomerization process. Specifically, the ketone production method of the present invention shows high selectivity and conversion so that the resulting ketone(s) can be employed in various applications and can be upgraded, processed further, using various methods, even if these methods do not tolerate large amounts of residues such as in particular unreacted acid residue.

According to the method of the present invention, the ketone(s) is/are produced with high selectivity and conversion which eliminates the need for recycling or separation steps such as recycling or removing unreacted acids. In an embodiment a simple phase separation technique may be used with high efficiency. Specifically, 5-nonanone spontaneously separates from water, which allows such a simple phase separation. Further, it is possible that no separation other than removal of water and gaseous components is carried out. Separation of water as vapor is a further option which can be combined with any of the above options.

Use of Ketone(s) as Fuel Component as Such and/or Fuel Containing Ketone(s)

According to an aspect of the present invention, the ketone(s) is/are used as fuel component without further modification. For example, the ketone(s) may be blended with conventional fuel (fossil fuel or a mixture of fossil fuel and renewable fuel components other than the ketone) to obtain a fuel blend (or simply "fuel"). Further, the ketone(s) may be blended with renewable fuel components other than the ketone. Preferably, the ketone is produced using the ketone production method of the present invention.

The prior art concentrated on ketones, specifically 5-nonanone, as an intermediate for producing fuel components, in which the ketones are then further processed e.g. by hydrogenation and subsequent condensation. The inventors of the present invention surprisingly found that ketone(s) may be used as a fuel component as such without further modification and still provide good fuel properties.

Specifically, the inventors found that fuels (fuel blends), specifically diesel, jet and/or gasoline fuel (blends), containing ketone(s), such as 5-nonanone, remain homogeneous for very long time. Accordingly, ketone(s) can be used as a fuel component without phase separation of fuel over time. Further, the oxygen contained in ketone molecules can help improving the combustion process.

In the present invention, ketone(s) is/are employed as a fuel component, preferably in admixture with conventional fuel (i.e. fossil fuel or a mixture of fossil fuel and renewable fuel) or in admixture with renewable fuel. It is thus preferable that the content of the ketone(s) in the fuel is 2.0 vol-% or more, 2.5 vol-% or more, 3.0 vol-% or more, 3.5 vol-% or more, 4.0 vol-% or more, 4.5 vol-% or more, 5.0 vol-% or more, 5.5 vol-% or more, 6.0 vol-% or more, 7.0 vol-% or more, 8.0 vol-% or more, or 10.0 vol-% or more.

Good fuel properties are achieved even when a high amount of the ketone(s) is employed. Nevertheless, the content of the ketone(s) in the fuel should preferably be 50.0 vol-% or less, preferably 45.0 vol-% or less, 40.0 vol-% or less, 35.0 vol-% or less, 30.0 vol-% or less, 25.0 vol-% or less, 20.0 vol-% or less, 15.0 vol-% or less, or 12.0 vol-% or less.

A particularly preferred content of the ketone in the fuel is in the range of 2.0 vol-% to 20.0 vol-%, especially 2.0-15.0 vol-%.

The fuel according to an embodiment of the invention may comprise fossil fuel component(s) in addition to the ketone(s). The fossil fuel components, if present, may be contained in an amount of preferably 40.0 vol-% or more, 45.0 vol-% or more, 50.0 vol-% or more, or 55.0 vol-% or more.

The fuel according to the invention may comprise renewable fuel component(s) in addition to the ketone(s) or in addition to the ketone(s) and fossil fuel component(s). The content of the renewable fuel component(s), such as hydrotreated vegetable oil (HVO) and ethanol, is preferably 1.0 vol-% or more, 2.0 vol-% or more, 4.0 vol-% or more, or 6.0 vol-% or more when used in combination with fossil fuel. Although the content of the renewable fuel component(s) is not necessarily limited, it is desirable that the content thereof is 15.0 vol-% or less, 12.0 vol-% or less, 10.0 vol-% or less, 8.0 vol-% or less, or 7.0 vol-% or less when used in combination with fossil fuel. The content of the renewable fuel component(s) may be selected depending on the desired properties of the final fuel such as cetane number and octane number. If no fossil fuel component is contained in the fuel of the invention, the fuel may (essentially) consist of the ketone(s) and the renewable fuel component(s).

In the present invention, the fuel may consist of the ketone(s) and at least one of fossil fuel component(s) and renewable fuel component(s).

The fuel of the present invention may further comprise hydrocarbon fuel components as a balance. That is, if the sum of components mentioned above is less than 100 vol-%, the remainder may be hydrocarbon fuel components. The hydrocarbon fuel components may be derived from any source, e.g. fossil source or renewable source. The hydrocarbon fuel components may be neat compounds such as one single hydrocarbon but are usually mixtures of hydrocarbons having specific boiling point ranges i.e. hydrocarbon fractions. The hydrocarbon fractions may be selected depending on the type of fuel to be produced.

5-nonanone, as a preferred example of the ketone, shows a bRON value, which means blending RON value, which is determined using a 10 vol-% blend in gasoline in accordance with the procedure disclosed in U.S. Pat. No. 4,244,704 A of about 63 which makes it suitable as a blend component in gasoline fuel blends. When employed in gasoline fuel blends, the content of ketone(s), such as 5-nonanone, is preferably 2.0 vol-% or more, 2.5 vol-% or more, 3.0 vol-% or more, 3.5 vol-% or more, 4.0 vol-% or more, 4.5 vol-% or more, 5.0 vol-% or more, 6.0 vol-% or more, 7.0 vol-% or more, or 8.0 vol-% or more. In gasoline fuel blends, the content of ketone(s), such as 5-nonanone, is preferably, 35.0 vol-% or less, 30.0 vol-% or less, 25.0 vol-% or less, 20.0 vol-% or less, 15.0 vol-% or less, or 12.0 vol-% or less. The remainder of the gasoline fuel blend may be hydrocarbon fuel components, renewable fuel and/or conventional fuel such as fossil fuel or a mixture of fossil fuel and other gasoline fuel components such as renewable fuel components.

Most preferably, the ketone(s), such as 5-nonanone, is/are employed as a blending component in diesel fuel blends. 5-nonanone has a bCN, blending cetane number, determined using the same type of calculation procedure as for bRON, of about 55, which is a good level for e.g. EN590 fuel. Further, although neat 5-nonanone has a cloud point (CP) of only −6.8° C., the inventors of the present invention surprisingly found that e.g. a diesel fuel blend containing 10 vol-% 5-nonanone did not deteriorate the cloud point. The blend had good cold properties. Accordingly, the ketone(s), especially 5-nonanone, can also be used in winter grade diesel fuel blends. When employed in diesel fuel blends, the content of ketone(s), such as 5-nonanone, is preferably 2.0 vol-% or more, 2.5 vol-% or more, 3.0 vol-% or more, 3.5 vol-% or more, 4.0 vol-% or more, 4.5 vol-% or more, 5.0 vol-% or more, 6.0 vol-% or more, 7.0 vol-% or more, or 8.0 vol-% or more. In diesel fuel blends, the content of the ketone(s), such as 5-nonanone, is preferably 45.0 vol-% or less, 40 vol-% or less, 35.0 vol-% or less, 30.0 vol-% or less, 25.0 vol-% or less, 20.0 vol-% or less, 17.0 vol-% or less, 15.0 vol-% or less, 13.0 vol-% or less, or 12.0 vol-% or less. The remainder of the diesel fuel blend may be hydrocarbon fuel components, renewable fuel components and/or conventional fuel such as fossil fuel or a mixture of fossil fuel and other fuel components such as renewable fuel components.

In the present invention, the relative contents of materials in a liquid mixture, blend, can be determined from the GC area in GC-MS analysis.

One further aspect of the present invention relates to a method of preparing a fuel by blending renewable fuel or conventional fuel, e.g. fossil fuel or a mixture of fossil fuel and renewable fuel, with the ketone(s). The method preferably comprises blending the ketone(s) such that the fuel of the present invention is obtained. Preferably, the ketone(s) is/are blended with renewable or conventional fuel comprising no ketone according to formula (1) or comprising less than 1.0 vol-%, preferably less than 0.5 vol-% thereof. In other words, it is preferred that renewable or conventional fuel is blended with the ketone(s) and the amount of addition of the ketone(s) is the same as the "content" of the ketone(s) as recited above with respect to the fuel of the present invention.

The present invention further relates to the use of the ketone(s) as a fuel component and to the use of the ketone(s) for preparing a fuel blend comprising the ketone(s) and other fuel components suitable to produce the fuel of the present invention.

EXAMPLES

The present invention is further illustrated by way of Examples. However, it is to be noted that the invention is not intended to be limited to the exemplary embodiments presented in the Examples.

In the Examples, the following measurement methods were used and it is preferred that these methods are used in accordance with the present invention:
Density: ENISO12185:1996
Cloud point: ASTM D7689:2012

CFPP (cold filter plugging point): EN116:2015
Cetane Number: EN15195:2014
Lower heating value: ASTM D4809:2013

Example 1

Pentanoic acid (PA) was prepared by hydrogenation of gamma-valerolactone (GVL) using a commercial bi-functional catalyst, which has acidic and metallic catalyst sites, in continuous run tests. Testrun conditions and GC results are presented in Table 1 below.

TABLE 1

| | | Process conditions | | | | Average product density and composition by GC | | | | | |
|---|---|---|---|---|---|---|---|---|---|---|---|
| Testrun No (days) | Feed GVL wt-% | Temperature °C. | Pressure bar | H2/oil (fresh feed) volume ratio (NTP) vol/vol | WHSV (organic feed) h$^{-1}$ | 1-pentanol | GVL | Pentanoic acid GC-area-% | Pentyl pentanoate | Others | Density g/cm$^3$ |
| 1 (3) | 100 | 200 | 40 | 1100 | 1.0 | 0.9 | 93.3 | 2.7 | 0.1 | 2.9 | 1015.0 |
| 2 (4) | 100 | 240 | 40 | 1100 | 1.0 | 1.8 | 73.4 | 21.7 | 2.1 | 1.1 | 993.0 |
| 3 (4) | 100 | 280 | 40 | 1100 | 1.0 | 0.1 | 7.4 | 84.6 | 4.9 | 3.0 | 916.9 |
| 4 (4) | 100 | 240 | 40 | 1100 | 0.5 | 0.9 | 71.2 | 24.6 | 1.9 | 1.4 | 991.6 |

About 85% PA selectivity based on GC-area-% was observed in testrun No 3. PA is a valuable chemical intermediate and it can be converted to 5-nonanone via ketonization reaction.

Comparable or even better conversion results can be expected when using other catalysts together with optimized reaction conditions.

Example 2

Conversion of PA to 5-nonanone was explored by ketonization of PA over $K_2O/TiO_2$ catalyst in a continuous flow reactor system using nitrogen as carrier gas and reaction conditions: temperature 375° C., pressure 1 bar (absolute pressure) and WHSV 1 h$^{-1}$. Water was separated after the product stream left the reactor.

The content of 5-nonanone was about 98-99 GC-area-%. Further, no pentanoic acid was observed, indicating 100% conversion. Accordingly, no complicated separation of 5-nonanone from pentanoic acid was necessary. Based on GC analysis the sample consisted mainly of 5-nonanone and minor amounts of oxygen compounds (being named as "other" 1 to 5 in test results), like 1-butanol, pentanal, 2-hexanone, 4-octanone, 3-methyl-4-octanone and 4,4,5-trimethyl-2-cyclohexenone. The density of the organic product stream consisting essentially of 5-nonanone was 826-827 kg/m$^3$.

GC and density results of pentanoic acid ketonization are presented in Table 2.

TABLE 2

| Testrun (days) | Density kg/m3 | Pentanoic acid area-% | 5-Nonanone area-% | Other 1 area-% | Other 2 area-% | Other 3 area-% | Other 4 area-% | Other 5 area-% |
|---|---|---|---|---|---|---|---|---|
| 1 | 826.2 | 0 | 98.2 | 1.1 | 0.1 | 0.2 | 0.2 | 0.2 |
| 2 | 825.8 | 0 | 98.4 | 1.0 | 0.1 | 0.2 | 0.2 | 0.1 |
| 3 | 825.8 | 0 | 98.6 | 0.9 | 0.1 | 0.2 | 0.1 | 0.1 |
| 4 | 825.6 | 0 | 98.9 | 0.6 | 0.1 | 0.2 | 0.1 | 0.1 |
| 5 | 825.7 | 0 | 98.8 | 0.8 | 0.1 | 0.1 | 0.1 | 0.1 |
| 6 | 825.6 | 0 | 98.7 | 0.9 | 0.1 | 0.1 | 0.1 | 0.1 |
| 7 | 826.7 | 0 | 98.1 | 1.3 | 0.2 | 0.2 | 0.2 | 0.2 |
| 8 | 825.7 | 0 | 98.8 | 0.8 | 0.1 | 0.1 | 0.1 | 0.1 |
| 9 | 825.7 | 0 | 98.8 | 0.8 | 0.1 | 0.1 | 0.1 | 0.1 |

Example 3

Suitability of 5-nonanone as a traffic fuel component was studied. 5-nonanone was blended with both fossil diesel fuel and fossil oxygen-free gasoline fuel and critical properties of the blends were measured.

It is known that 5-nonanone (CAS 502-56-7) has the following properties: boiling point 186° C., density 0.826 g/cm$^3$, oxygen content 11.2 wt-%. In view of the boiling point value, 5-nonanone suits both fuels; diesel and gasoline. It may even be employed in jet fuel.

Measured properties for the 90 vol-% fossil diesel+10 vol-% 5-nonanone blend are presented in table 3 below.

TABLE 3

| Tested blend | Density (kg/m$^3$) | Cloud point (° C.) | CFPP (° C.) | Cetane No | Lower heating value (MJ/l) |
|---|---|---|---|---|---|
| Fossil diesel | 818.4 | −28.6 | −31 | 47.5* | 35.4 |
| 90% fossil diesel + 10% 5-nonanone | 818.7 | −29.3 | −30 | 48.3* | 34.9 |

*on the above table means Cetane number achieved without using cetane improver.

In the light of the test results ketone improved or did not substantially decrease the fuel blend properties. Specifically, the addition of 10 vol-% of 5-nonanone had good effect of the analyzed properties in diesel blend when compared to pure fossil diesel. That is, both cloud point and cetane number are improved by addition of the ketone. This is even more surprising when considering that neat 5-nonanone has a cloud point (CP) of only −6.8° C. Cold properties of the blend are in a good level. Oxygen content of the blend was calculated to be 1.1 wt.-%. Nevertheless, the heating value of the diesel blend (fossil diesel+5-nonanone) stayed close to the original level in spite of the addition of the oxygenate (5-nonanone). Conventionally, oxygen containing molecules were seen as energy content decreasing components.

5-nonanone has a bRON value of ca. 63 and it can be used also as a blend component in gasoline fuel blends. Measured properties for the 90 vol-% fossil oxygen-free gasoline+10 vol-% 5-nonanone blend are presented in table 4 below.

TABLE 4

| Tested blend | Density (kg/m3) | RON | Lower heating value (MJ/l) |
|---|---|---|---|
| Fossil oxygen-free gasoline | 741.9 | 95.3 | 32.1 MJ/l |
| 90% fossil oxygen-free gasoline + 10% 5-nonanone | 752.5 | 92.1 | 32.1 MJ/l |

Oxygen content of the blend was 1.2 wt.-%. When 5-nonanone was blended with gasoline, although the ketone slightly decreased the RON, the heating value remained on the same level. Thus, 5-nonanone can also be used as a component of gasoline fuel.

The invention claimed is:

1. A diesel fuel consisting of:
   diesel fuel and
   5-nonanone,
   wherein the content of the 5-nonanone in the fuel is 2.0 to 45.0 vol-%.

2. The diesel fuel according to claim 1, wherein the content of the 5-nonanone is 2.0-20.0 vol-%.

3. The diesel fuel according to claim 1, wherein the content of the 5-nonanone 2.0-15.0 vol-%.

4. A method of preparing a diesel fuel, the method consisting of:
   blending a diesel fuel with 5-nonanone, wherein the content of the 5-nonanone in the fuel is 2.0 to 45.0 vol-%.

5. A diesel fuel consisting of:
   diesel fuel,
   5-nonanone, and
   a renewable fuel component,
   wherein the content of 5 nonanone in the fuel is 2.0 to 45.0 vol-%.

6. The diesel fuel according to claim 5, wherein the content of the 5 nonanone is 2.0-20.0 vol-%.

7. The diesel fuel according to claim 5, wherein the content of the 5 nonanone in the fuel is 2.0 to 15.0 vol-%.

* * * * *